(12) United States Patent
Velikevitch et al.

(10) Patent No.: US 10,972,283 B2
(45) Date of Patent: *Apr. 6, 2021

(54) SYSTEM, METHOD, AND COMPUTER PROGRAM PRODUCT FOR ZERO ROUND TRIP SECURE COMMUNICATIONS BASED ON NOISY SECRETS

(71) Applicant: Dark Matter L.L.C., Dubai (AE)

(72) Inventors: Serguei Velikevitch, Richmond Hill (CA); Alexander Sherkin, Vaughan (CA)

(73) Assignee: DIGITAL 14 LLC, Abu Dhabi (AE)

(*) Notice: Subject to any disclaimer, the term of this patent is extended or adjusted under 35 U.S.C. 154(b) by 210 days.

This patent is subject to a terminal disclaimer.

(21) Appl. No.: 16/352,503

(22) Filed: Mar. 13, 2019

(65) Prior Publication Data

US 2020/0295944 A1 Sep. 17, 2020

(51) Int. Cl.
*H04L 9/32* (2006.01)
*H04L 9/08* (2006.01)
(Continued)

(52) U.S. Cl.
CPC .......... *H04L 9/3242* (2013.01); *H04L 9/0819* (2013.01); *H04L 9/0869* (2013.01);
(Continued)

(58) Field of Classification Search
CPC . H04L 9/32; H04L 9/3242; H04L 9/08; H04L 9/0819; H04L 9/0869; H04L 9/065;
(Continued)

(56) References Cited

U.S. PATENT DOCUMENTS

| 9,953,166 | B2* | 4/2018 | Newell | G06F 21/44 |
| 2010/0211787 | A1* | 8/2010 | Bukshpun | H04L 9/065 |
| | | | | 713/170 |

(Continued)

FOREIGN PATENT DOCUMENTS

WO WO-2016191176 A1 * 12/2016 ............ H04W 12/04

OTHER PUBLICATIONS

Microcontroller-based Implementation of ParseKey+ for Limited Resources Embedded Applications BY Reza Makvandi Eastern Mediterranean University, Gazirnagusa, North Cyprus URI: http://hdl.handle.net/11129/178 pp. 87; Feb. 2011.*

*Primary Examiner* — Samson B Lemma
*Assistant Examiner* — Ali H. Cheema
(74) *Attorney, Agent, or Firm* — Zilka-Kotab, P.C.

(57) ABSTRACT

A system, method, and computer program product are provided for implementing zero round trip secure communications based on a noisy secret. In operation, a sender system utilizes a randomly generated message key for encrypting a message to send to a receiver system. The sender system selects a plurality of different sub-keys from a negotiated noisy secret to encrypt the randomly generated message key. The sender system encrypts the message utilizing the randomly generated message key. The sender system sends the encrypted message, all encrypted message keys, and a message MAC that is calculated and added for every sub-key, to the receiver system such that the receiver system is able to perform a MAC-based verification to test sub-key validity of the plurality of different sub-keys.

16 Claims, 7 Drawing Sheets

(51) Int. Cl.
 *H04L 29/06* (2006.01)
 *H04W 12/04* (2021.01)
 *G09C 1/00* (2006.01)

(52) U.S. Cl.
 CPC ............ *H04L 63/0428* (2013.01); *G09C 1/00* (2013.01); *H04L 9/0866* (2013.01); *H04W 12/04* (2013.01)

(58) Field of Classification Search
 CPC ... H04L 9/0866; H04L 63/04; H04L 63/0428; H04W 12/04; G09C 1/00
 USPC .......................................... 713/170, 171, 180
 See application file for complete search history.

(56) References Cited

U.S. PATENT DOCUMENTS

| | | | | |
|---|---|---|---|---|
| 2010/0299529 | A1* | 11/2010 | Fielder .................. | G06F 21/602 |
| | | | | 713/181 |
| 2016/0302137 | A1* | 10/2016 | Escott ............... | H04W 12/1006 |
| 2018/0248691 | A1* | 8/2018 | Henderson ............... | G09C 1/00 |
| 2019/0080091 | A1* | 3/2019 | Kim ........................ | G06F 21/57 |
| 2020/0195427 | A1* | 6/2020 | Beck ..................... | H04L 9/3242 |

* cited by examiner

SYSTEM, METHOD, AND COMPUTER PROGRAM PRODUCT FOR ZERO ROUND TRIP SECURE COMMUNICATIONS BASED ON NOISY SECRETS

FIELD OF THE INVENTION

The present invention relates to implementing secure communications, and more particularly to implementing zero round trip secure communications based on a noisy secret.

BACKGROUND

Secure communication based on a negotiated secret assumes that the secret is exactly the same for both the sender and the receiver. The secret allows both parties to derive the same key and use it to encrypt and decrypt messages. In the case when the negotiated secret is noisy, a reliable negotiation of the same key becomes a problem.

Having a noisy secret means that sender's version and the receiver's version of the negotiated secret have the same size but differ in a small number of bits. These bits are considered noisy bits. A noiseless sub-key has no noisy bits selected from the negotiated noisy secret. Message loss means that message cannot be decrypted on the receiver side because of a noisy key. Current systems fail to effectively address issues associated with negotiated noisy secrets.

There is thus a need for addressing these and/or other issues associated with the prior art.

SUMMARY

A system, method, and computer program product are provided for implementing zero round trip secure communications based on a noisy secret. In operation, a sender system utilizes a randomly generated message key for encrypting a message to send to a receiver system. The sender system selects a plurality of different sub-keys from a negotiated noisy secret to encrypt the randomly generated message key. The sender system encrypts the message utilizing the randomly generated message key. The sender system sends the encrypted message, all encrypted message keys, and a message MAC that is calculated and added for every sub-key, to the receiver system such that the receiver system is able to perform a MAC-based verification to test sub-key validity of the plurality of different sub-keys.

DETAILED DESCRIPTION

Figure 1:
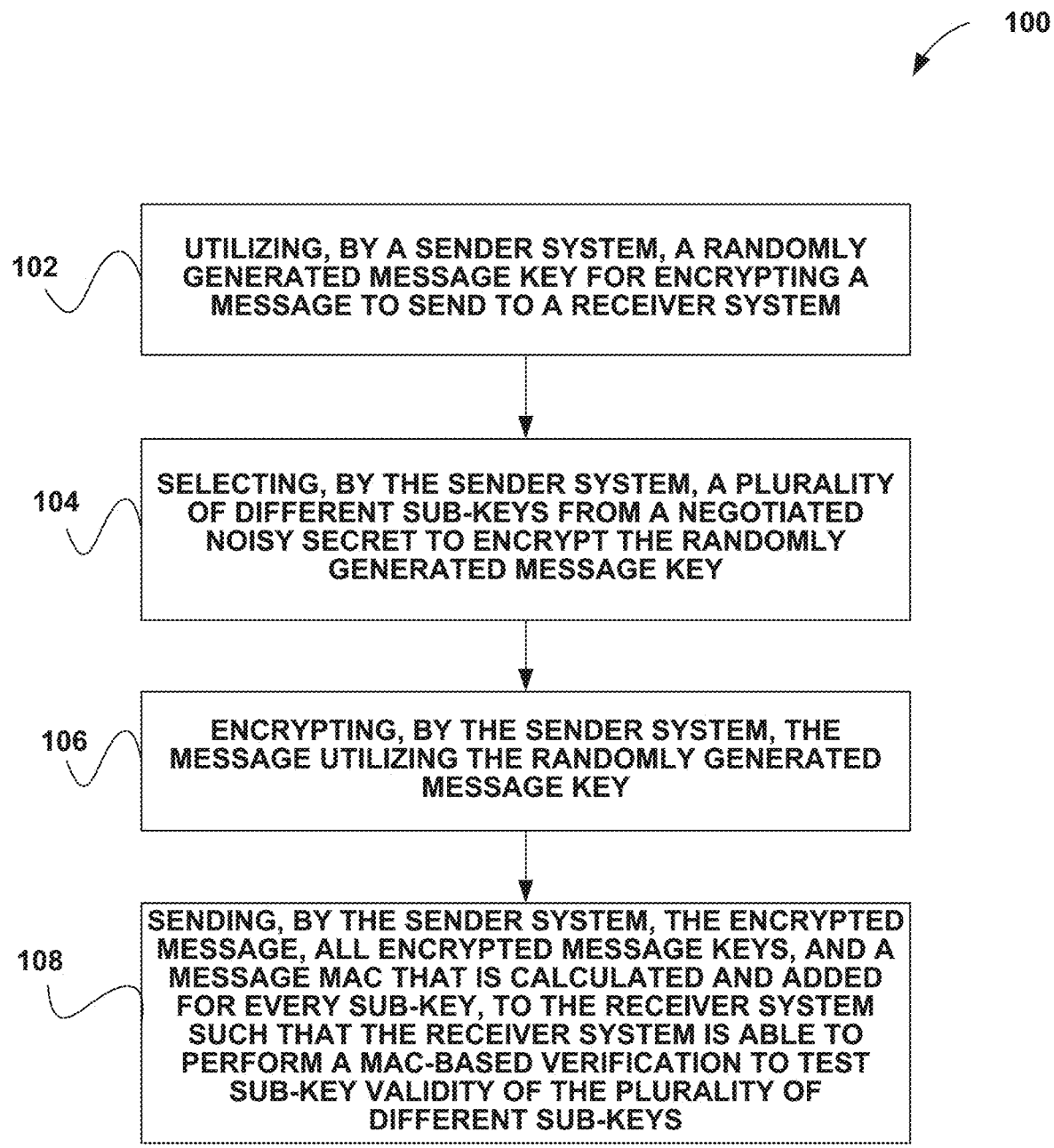
FIG. 1 shows a method for implementing zero round trip secure communications based on a noisy secret, in accordance with one embodiment.

FIG. 1 shows a method 100 for implementing zero round trip secure communications based on a noisy secret, in accordance with one embodiment.

In operation, a sender system utilizes a randomly generated message key (e.g. generated by the sender system) for encrypting a message to send to a receiver system. See operation 102. The sender system and/or the receiver system may include any device capable of sending messages, such as a computer (e.g. tablet, laptop, desktop, etc.), a mobile phone, a gaming device, etc.

The sender system selects a plurality of different sub-keys from a negotiated noisy secret to encrypt the randomly generated message key. See operation 104. The sender system encrypts the message utilizing the randomly generated message key. See operation 106.

The sender system sends the encrypted message, all encrypted message keys, and a message MAC (message authentication code) that is calculated and added for every sub-key, to the receiver system such that the receiver system is able to perform a MAC-based verification to test sub-key validity of the plurality of different sub-keys. See operation 108.

In one embodiment, the sender system may select the plurality of different sub-keys from the negotiated noisy secret utilizing a deterministic algorithm. In this case, the receiver system may obtain the plurality of different sub-keys from the negotiated noisy secret utilizing the same deterministic algorithm.

In another embodiment, the sender system may select the plurality of different sub-keys from the negotiated noisy secret utilizing random selection. In this case, the sender system may include a mask that indicates selected bits from the negotiated noisy secret in the encrypted message. The receiver system may obtain the plurality of different sub-keys from the negotiated noisy secret utilizing the mask. A different mask is added for every sub-key. The sub-key mask is applied to the negotiated noisy secret to identify bits that belong to this sub-key.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
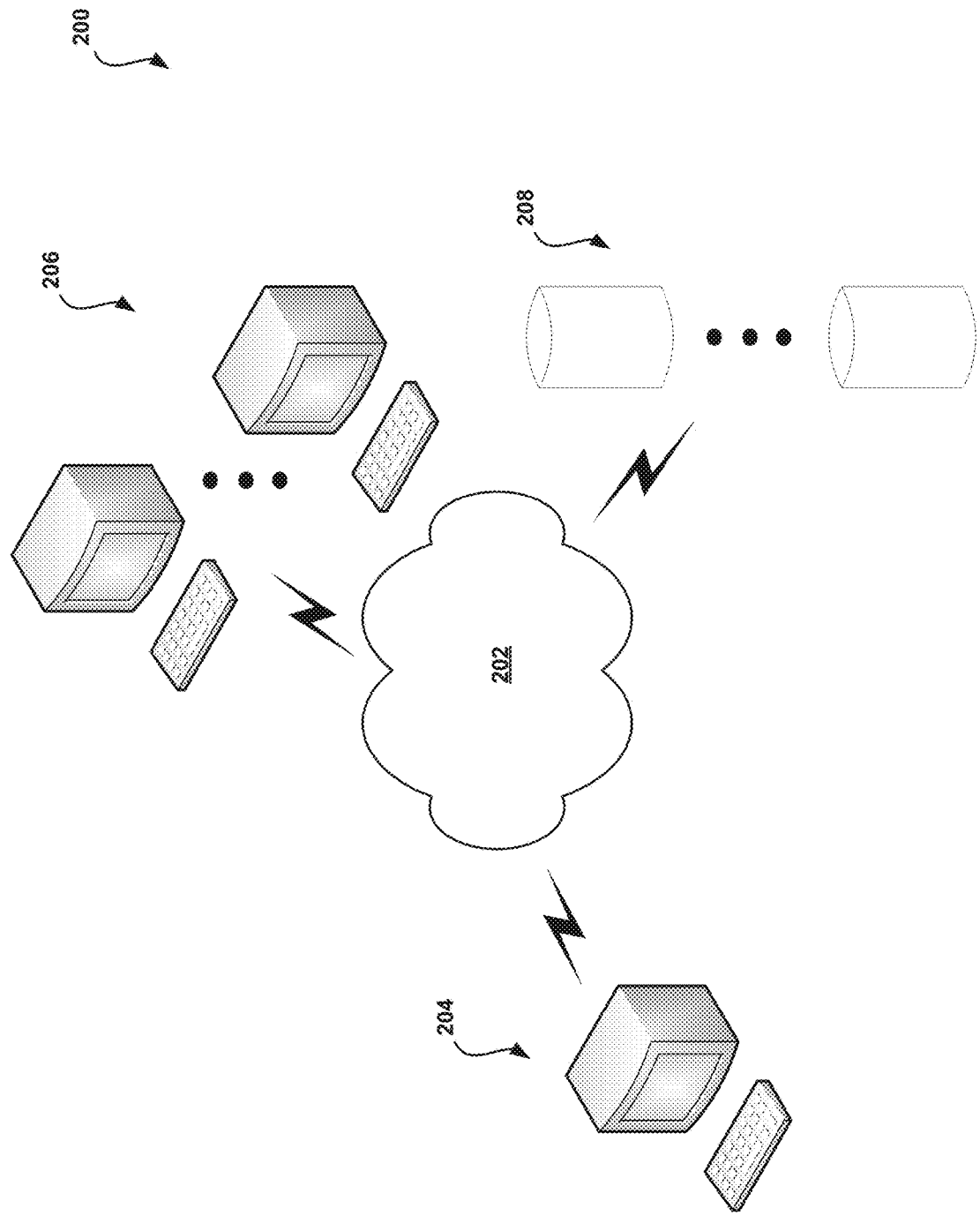
FIG. 2 shows a system for implementing zero round trip secure communications based on a noisy secret, in accordance with one embodiment.

FIG. 2 shows a system 200 for implementing zero round trip secure communications based on a noisy secret, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206, either directly or over one or more networks 202, for ensuring secure communications based on noisy secrets. The system 204 may also be in communication with one or more repositories/databases 208.

Secure communication based on a negotiated secret assumes that the secret is exactly the same for both the sender and the receiver. The secret allows both parties to derive the same key and use it to encrypt and decrypt messages. In the case when the negotiated secret is noisy, a reliable negotiation of the same key becomes a problem.

Having a noisy secret means that sender's and receiver's versions of the negotiated secret have the same size but differ in a small number of bits. These bits are considered noisy bits. A noiseless sub-key has no noisy bits selected from the negotiated noisy secret. Message loss means that a message cannot be decrypted on the receiver side because of a noisy key.

One solution is to fix the secret's noisy bits by exchanging information between communicating parties. Before these steps are completed, messages cannot be sent. That means that if a receiver is not online to fix the secret, the sender cannot send any messages.

The solution described herein (and implemented in the context of the system 200) allows sending and receiving messages without fixing the noisy secret by selecting multiple sub-keys from the negotiated noisy secret to encrypt a message key so that at least one of the sub-keys does not have any noise. In this case, it is assumed that if the negotiated secret is noisy, the number of good bits is sufficiently larger than the required key length. For example, the negotiated secret may be 512 bits with 32 bad bits. An acceptable key size may be 128 bits.

The system 200 allows sending and receiving messages without fixing the noisy secret by selecting multiple sub-keys from the negotiated noisy secret to encrypt a message key so that at least one of the sub-keys does not have any noise. This approach increases the message size but allows sending messages to an offline receiver without fixing the noisy secret first. It is always possible that no noiseless sub-key is selected, but the probability of such scenario can be reduced to an acceptable level by increasing the number of selected sub-keys.

The probability of successful message decryption with one sub-key selected from the negotiated noisy secret may be unacceptable. Sending multiple sub-keys increases the probability that at least one of the sub-keys is noiseless.

The following example explains why sending multiple sub-keys improves the probability of finding a noiseless sub-key required to successfully decrypt a message: assume that the probability of selecting a noiseless sub-key is $p=0.5$; assume that an acceptable level of message loss is 0.001; the probability of having no noiseless sub-keys out of N sub-keys is $(1-p)^N$ and decreases exponentially with N; to get to an acceptable message loss level of 0.001, 10 sub-keys have to be selected; the probability of all 10 randomly selected sub-keys having some noise is $(1-0.5)^{10}<0.001$.

Figure 3:
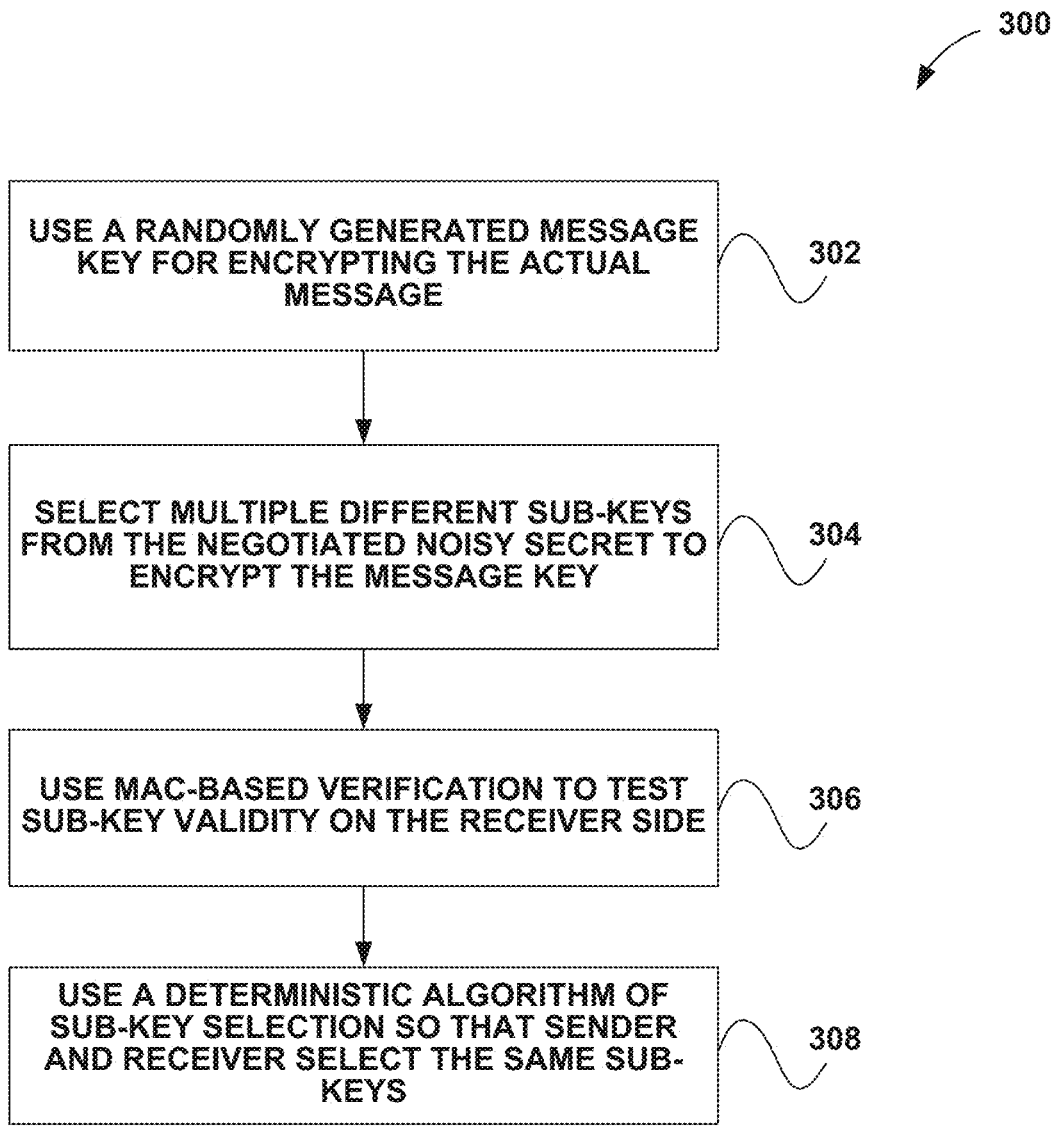
FIG. 3 shows a system flow diagram illustrating steps for implementing zero round trip secure communications based on a noisy secret, in accordance with another embodiment.

FIG. 3 shows a system flow diagram 300 illustrating steps for implementing zero round trip secure communications based on a noisy secret, in accordance with another embodiment. As an option, the system flow diagram 300 may be carried out in the context of any of the previously described figures. Of course, however, the system flow diagram 300 may be carried out in any desired context. It should also be noted that the aforementioned definitions may apply during the present description.

In operation, a system uses a randomly generated message key for encrypting the actual message. See operation 302. The system selects multiple different sub-keys from the negotiated noisy secret to encrypt the message key. See operation 304.

The system uses a message authentication code (MAC) based verification to test sub-key validity on the receiver side. See operation 306. The system then uses a deterministic algorithm of sub-key selection so that sender and receiver select the same sub-keys. See operation 308. Any suitable deterministic algorithm of sub-key selection may be utilized.

Sub-keys can be selected randomly, but then a negotiated noisy secret mask has to be sent with every sub-key, which increases message size by the number of sub-keys multiplied by negotiated noisy secret length. The negotiated noisy secret mask is a bit mask that marks selected bits for a sub-key.

Figure 4:
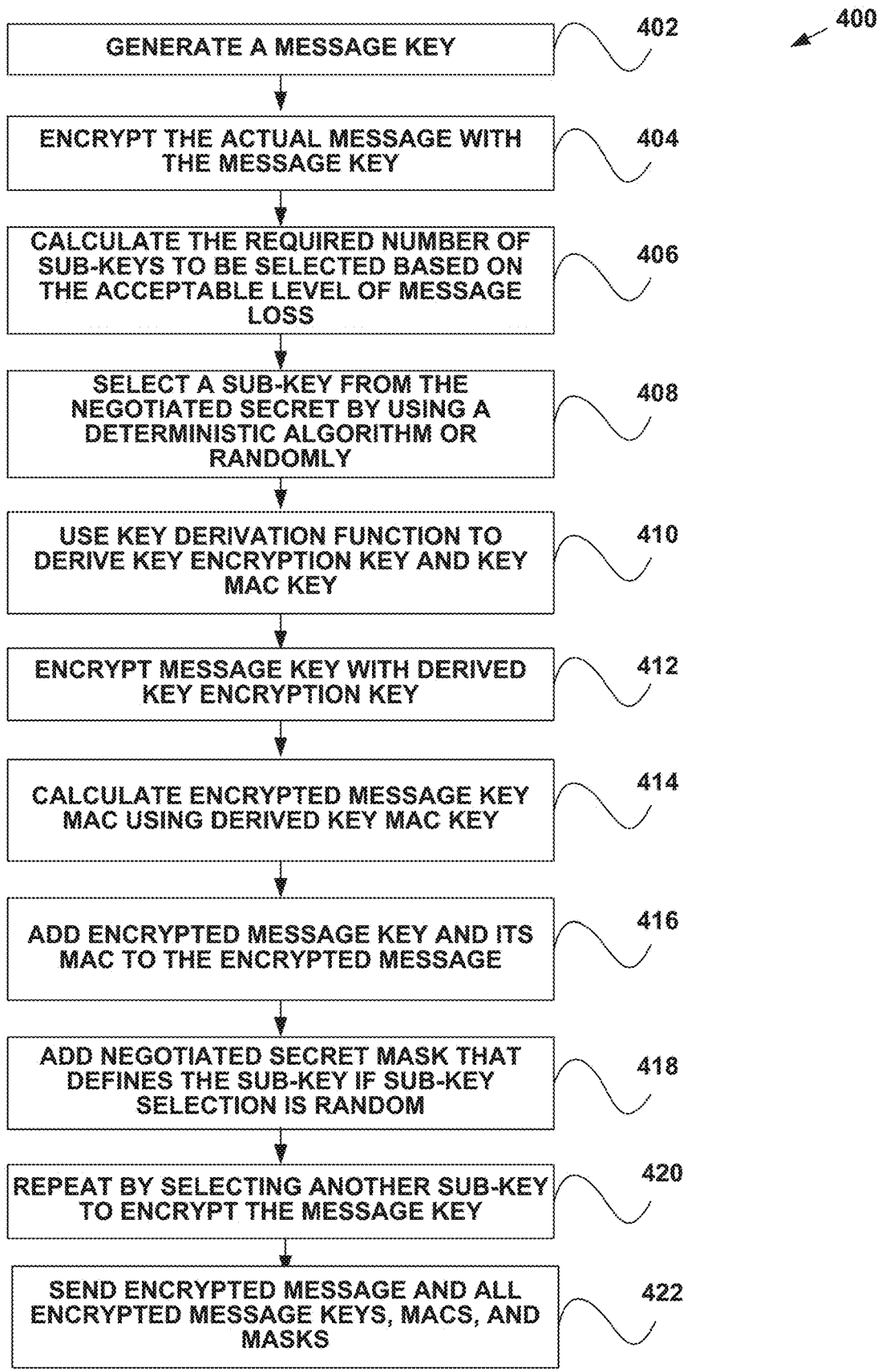
FIG. 4 shows a system flow diagram illustrating steps for a sender system implementing zero round trip secure communications based on a noisy secret, in accordance with another embodiment.

FIG. 4 shows a system flow diagram 400 illustrating steps for a sender system implementing zero round trip secure communications based on a noisy secret, in accordance with another embodiment. As an option, the system flow diagram 400 may be carried out in the context of any of the previously described figures. Of course, however, the system flow diagram 400 may be carried out in any desired context. It should also be noted that the aforementioned definitions may apply during the present description.

In operation, a sender system generates a message key. See operation 402. The sender system encrypts the actual message with the message key. See operation 404. The sender system calculates the required number of sub-keys to be selected based on the acceptable level of message loss. See operation 406.

The sender system selects a sub-key from the negotiated secret by using a deterministic algorithm or a random selection. See operation 408. If the sub-key is selected randomly, a mask that indicates selected bits from the negotiated secret has to be included into the encrypted message.

The sender system uses a key derivation function to derive the key encryption key and the key MAC key. See operation 410. The sender system encrypts the message key with a derived key encryption key. See operation 412.

The sender system calculates the encrypted message key MAC using the derived key MAC key. See operation 414. The sender system adds the encrypted message key and its MAC to the encrypted message. See operation 416.

Further, the sender system adds a negotiated secret mask that defines the sub-key if the sub-key selection is random. See operation 418.

The sender system repeats operations 408-418 by selecting another sub-key to encrypt the message key, etc. See operation 420. The sender system then sends the encrypted message and all encrypted message keys, MACs, and masks. See operation 422. The sub-key message data={encrypted message key, message key MAC, [optional] sub-key mask}. The message format={encrypted message, array of sub-key message data}.

Figure 5:
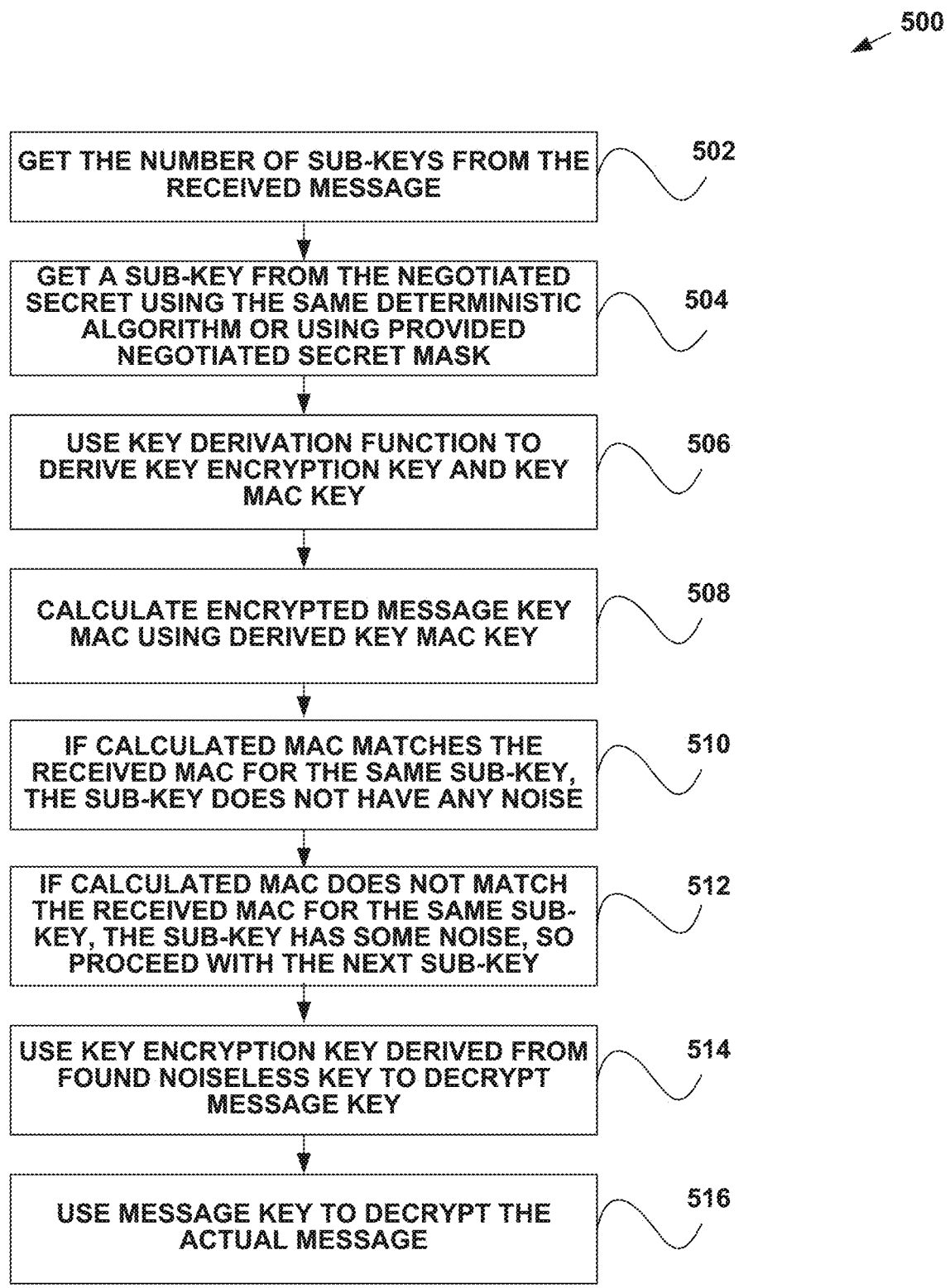
FIG. 5 shows a system flow diagram illustrating steps for a receiver system implementing zero round trip secure communications based on a noisy secret, in accordance with another embodiment.

FIG. 5 shows a system flow diagram 500 illustrating steps for a receiver system implementing zero round trip secure communications based on a noisy secret, in accordance with another embodiment. As an option, the system flow diagram 500 may be carried out in the context of any of the previously described figures. Of course, however, the system flow diagram 500 may be carried out in any desired context. It should also be noted that the aforementioned definitions may apply during the present description.

In operation, a receiver system obtains the number of sub-keys from the received message. See operation 502. The receiver system obtains a sub-key from the negotiated secret using the same deterministic algorithm as the sender system or using a provided negotiated secret mask (in the case of random selection). See operation 504.

The receiver system uses a key derivation function to derive a key encryption key and a key MAC key. See operation 506. The receiver system calculates an encrypted message key MAC using the derived key MAC key. See operation 508.

If the calculated MAC matches the received MAC for the same sub-key, the receiver system determines that the sub-key does not have any noise. See operation 510. If the calculated MAC does not match the received MAC for the same sub-key, the receiver system determines that the sub-key has some noise, and proceeds with the next sub-key. See operation 512.

The receiver system uses the key encryption key derived from a found noiseless key to decrypt message key. See operation 514. Further, the receiver system uses the message key to decrypt the actual message. See operation 516.

As one example of message size overhead, assume the negotiated secret has 1024 bits but 32 of them do not match for sender and receiver. The sub-key size is 128 bits. The sub-key bits are selected from the negotiated secret. Each sub-key requires extra information to be included: encrypted message key (128 bits), and encrypted message key MAC (256 bits). Overhead is 384 bits or 48 bytes per sub-key.

In this example, the probability of randomly selecting a noiseless sub-key is 0.013, no overhead. The probability of having at least one noiseless sub-key from 10 randomly selected sub-keys is 0.12, and overhead is 10*48=480 bytes. The probability of having at least one noiseless sub-key from 100 randomly selected sub-keys is 0.73, and overhead is 100*48=4.69 Kbytes. The probability of having at least one noiseless sub-key from 1000 randomly selected sub-keys is 0.999998, and overhead is 1000*48=46.9 Kbytes.

As one example of a deterministic sub-key selection procedure, assume that the negotiated secret has 1024 bits. The sub-key size is 128 bits. To select a sub-key, the sender or receiver should select 128 bits from the negotiated secret's 1024 bits. A deterministic algorithm must produce the same sequence of sub-keys every time. One way to do it is to use pseudorandom number generator (PRNG) always seeded with the same seed. This produces the same random number sequence every time it is used. The negotiated secret's 1024 bits is split into 128 buckets. Each bucket has 8 bits. Use PRNG to select one bit from every bucket as a random number MOD 8. 8^128=3.9*10^115 different sub-keys can be selected this way. The probability of random selection of the same key is negligible. Using the same key twice does not have any side effects besides increasing message size and processing the same key on the receiver side.

As one example of a required number of sub-keys calculation, assume that the negotiated noisy secret has 1024 bits with 32 noisy bits. The sub-key size is 128 bits. The first step is to calculate the probability P1 of a single sub-key to be a noiseless sub-key as $$\prod_{0}^{31} \frac{1024-128-i}{1024-i}.$$

The second step is to find the minimum required number of sub-keys N such that $(1-P1)^N <$ acceptable level of message loss (L). The minimum required number of sub-keys N should be greater than $\log(L)/\log(1-P1)$.

Figure 6:
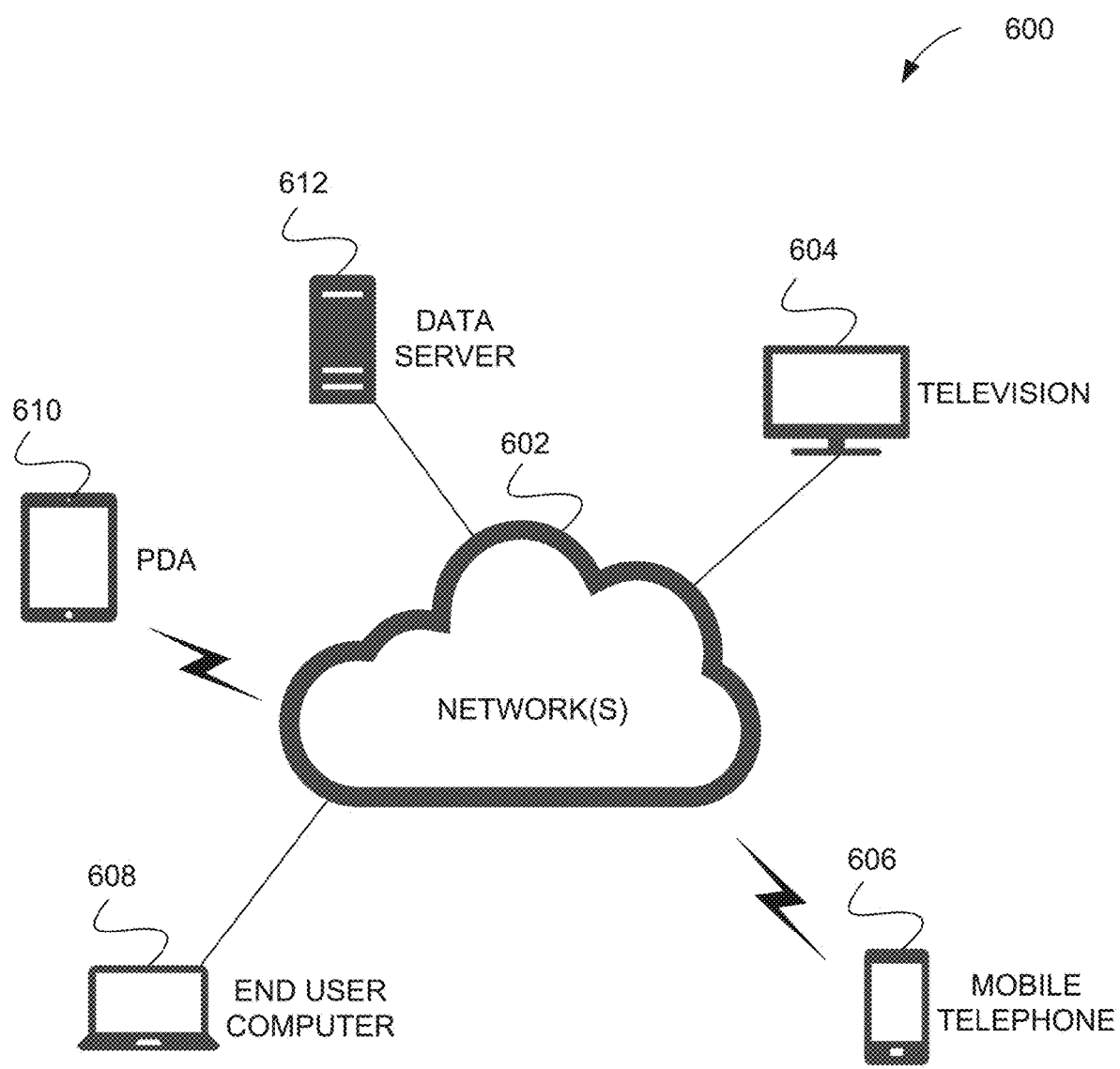
FIG. 6 illustrates a network architecture, in accordance with one embodiment.

FIG. 6 illustrates a network architecture 600, in accordance with one embodiment. As shown, at least one network 602 is provided. In various embodiments, any one or more components/features set forth during the description of any previous figure(s) may be implemented in connection with any one or more of the components of the at least one network 602.

In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 612 and an end user computer 608 may be coupled to the network 602 for communication purposes. Such end user computer 608 may include a desktop computer, lap-top computer, and/or any other type of logic. Still yet, various other devices may be coupled to the network 602 including a personal digital assistant (PDA) device 610, a mobile phone device 606, a television 604, etc.

Figure 7:
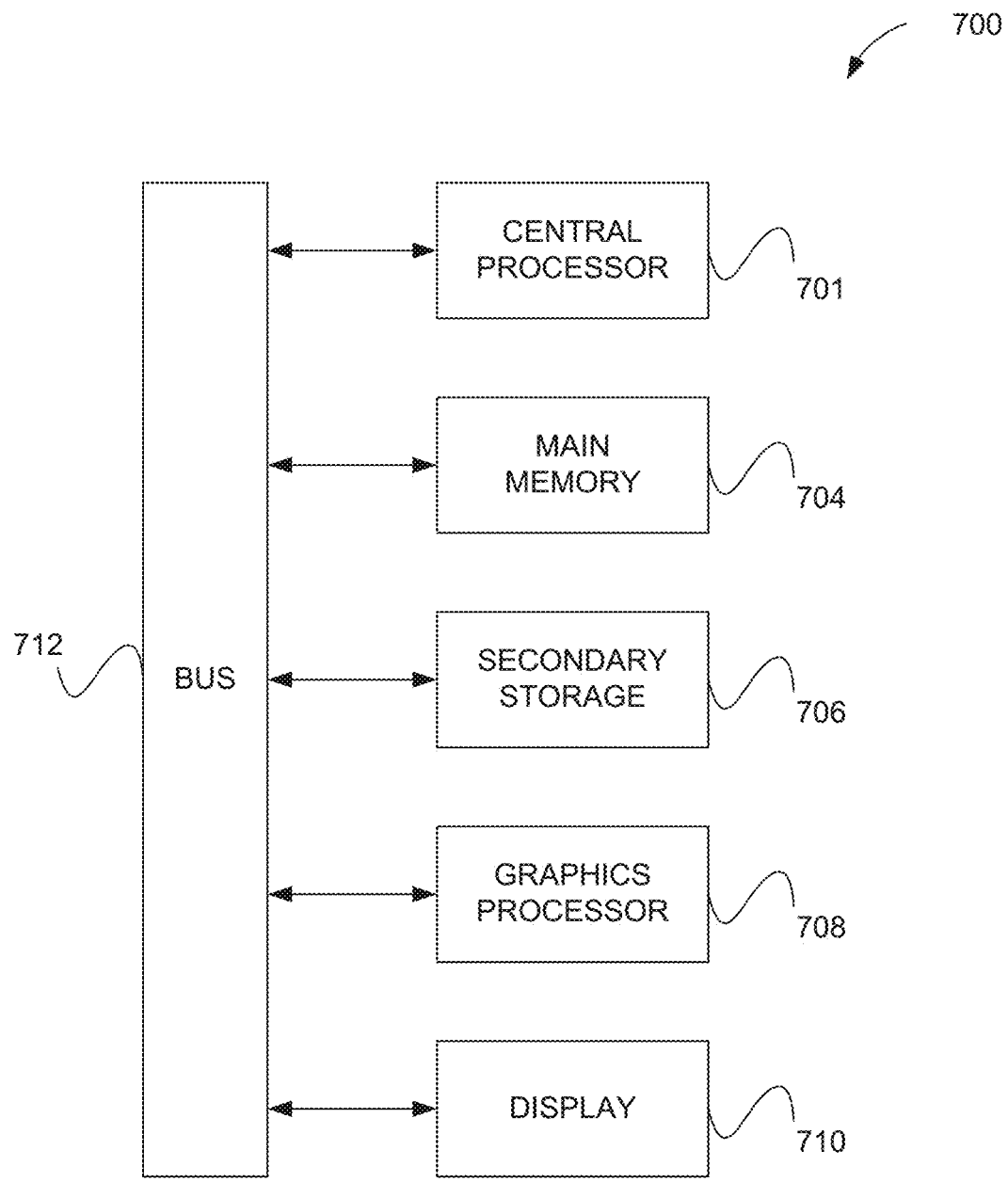
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. However, it is to be appreciated that the system 700 may be implemented in any desired environment.

As shown, a system 700 is provided including at least one central processor 702 which is connected to a bus 712. The system 700 also includes main memory 704 [e.g., hard disk drive, solid state drive, random access memory (RAM), etc.]. The system 700 also includes a graphics processor 708 and a display 710.

The system 700 may also include a secondary storage 706. The secondary storage 706 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 706, and/or any other memory, for that matter. Such computer programs, when executed, enable the system 700 to perform various functions (as set forth above, for example). Memory 704, secondary storage 706 and/or any other storage are possible examples of non-transitory computer-readable media.

In one embodiment, means in the form of the processor 702 (and/or different means corresponding to different components thereof) executes instructions in the memory 704 or in the secondary storage 706 for: utilizing, by a sender system, a randomly generated message key for encrypting a message to send to a receiver system; selecting, by the sender system, a plurality of different sub-keys from a negotiated noisy secret to encrypt the randomly generated message key; encrypting, by the sender system, the message utilizing the randomly generated message key; and sending, by the sender system, the encrypted message, all encrypted message keys, and a message MAC that is calculated and added for every sub-key, to the receiver system such that the receiver system is able to perform a MAC-based verification to test sub-key validity of the plurality of different sub-keys.

Optionally, in any of the preceding embodiments, the sender system may select the plurality of different sub-keys from the negotiated noisy secret utilizing a deterministic algorithm. In this case, optionally, the receiver system may obtain the plurality of different sub-keys from the negotiated noisy secret utilizing the same deterministic algorithm.

Optionally, in any of the preceding embodiments, the sender system may select the plurality of different sub-keys from the negotiated noisy secret utilizing random selection. In this case, optionally, the sender system may include sub-key masks that indicate selected bits from the negotiated noisy secret in the encrypted message. In this case, optionally, the receiver system may obtain the plurality of different sub-keys from the negotiated noisy secret utilizing the sub-key masks.

In another embodiment, means in the form of the processor 702 (and/or different means corresponding to different components thereof) executes instructions in the memory 704 or in the secondary storage 706 to: generate a message key; encrypt the actual message with the message key; calculate the required number of sub-keys to be selected based on the acceptable level of message loss; select a sub-key from the negotiated secret by using a deterministic algorithm or a random selection; if the sub-key is selected randomly, include a mask that indicates selected bits from the negotiated secret in the encrypted message; use a key derivation function to derive the key encryption key and the key MAC key; encrypt the message key with a derived key encryption key; calculate the encrypted message key MAC using the derived key MAC key; add the encrypted message key and its MAC to the encrypted message; add a negotiated secret mask that defines the sub-key if the sub-key selection is random; repeat preceding operations by selecting another sub-key to encrypt the message key, etc.; and send the encrypted message and all encrypted message keys, MACs, and masks.

In another embodiment, means in the form of the processor 702 (and/or different means corresponding to different components thereof) executes instructions in the memory 704 or in the secondary storage 706 to: receive an encrypted message; obtain the number of sub-keys from the received message; obtain a sub-key from the negotiated secret using the same deterministic algorithm or using a provided negotiated secret mask; use a key derivation function to derive a key encryption key and a key MAC key; calculate an encrypted message key MAC using the derived key MAC key; if the calculated MAC matches the received MAC for the same sub-key, determine that the sub-key does not have any noise; if the calculated MAC does not match the received MAC for the same sub-key, determine that the sub-key has some noise, and proceed with the next sub-key; use the key encryption key derived from found noiseless key to decrypt message key; and use the message key to decrypt the actual message.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer-implemented method performed by a computer processor executing memory instructions, the computer-implemented method comprising:

utilizing, by a sender device, a randomly generated message key for encrypting a message to send to a receiver device;

selecting, by the sender device, a plurality of different sub-keys from a negotiated noisy secret to encrypt the randomly generated message key and to generate a plurality of randomly generated encrypted message keys, wherein the sender device selects the plurality of different sub-keys from the negotiated noisy secret utilizing one of:

a deterministic algorithm, or random selection;

encrypting, by the sender device, the message utilizing the randomly generated message key; and sending, by the sender device, the encrypted message, the plurality of randomly generated encrypted message keys, and a message authentication code (MAC) that is calculated and added for every sub-key of the plurality of different sub-keys, to the receiver device such that the receiver device is able to perform a MAC-based verification to test sub-key validity of the plurality of different sub-keys;

wherein when the sender device selects the plurality of different sub-keys from the negotiated noisy secret utilizing random selection, the sender device includes sub-key masks that indicate selected bits from the negotiated noisy secret in the encrypted message, and the receiver device obtains the plurality of different sub-keys from the negotiated noisy secret utilizing the sub-key masks.

2. The method of claim 1, wherein the receiver device obtains the plurality of different sub-keys from the negotiated noisy secret utilizing the deterministic algorithm.

3. The method of claim 1, wherein the sender device calculates a required number of sub-keys to be selected based on an acceptable level of message loss.

4. The method of claim 1, wherein the sender device utilizes a key derivation function to derive a key encryption key and a key MAC key.

5. The method of claim 4, wherein the sender device encrypts the randomly generated message key with the derived key encryption key.

6. The method of claim 5, wherein the sender device calculates an encrypted message key MAC using a derived key MAC key.

7. The method of claim 6, wherein the sender device includes the encrypted message key and an associated MAC in the encrypted message.

8. The method of claim 1, wherein the receiver device obtains a number of the plurality of different sub-keys from the encrypted message.

9. The method of claim 8, wherein the receiver device uses a key derivation function to derive a key encryption key and a key MAC key.

10. The method of claim 9, wherein the receiver device calculates an encrypted message key MAC using the derived key MAC key.

11. The method of claim 10, wherein if a calculated MAC matches a received MAC for a common sub-key, the receiver device determines that the common sub-key does not have any noise.

12. The method of claim 10, wherein if a calculated MAC does not match a received MAC for a common sub-key, the receiver device determines that the common sub-key has some noise and proceeds with a next sub-key.

13. The method of claim 12, wherein the receiver device uses a key encryption key derived from a noiseless key to decrypt at least one of the plurality of randomly generated encrypted message keys.

14. The method of claim 13, wherein the receiver device uses the decrypted message key to decrypt the encrypted message.

15. A non-transitory computer readable medium storing computer code executable by a processor to perform a method comprising:
- utilizing, by a sender device, a randomly generated message key for encrypting a message to send to a receiver device;
- selecting, by the sender device, a plurality of different sub-keys from a negotiated noisy secret to encrypt the randomly generated message key and to generate a plurality of randomly generated encrypted message keys, wherein the sender device selects the plurality of different sub-keys from the negotiated noisy secret utilizing one of:
- a deterministic algorithm, or
- random selection;
- encrypting, by the sender device, the message utilizing the randomly generated message key; and
- sending, by the sender device, the encrypted message, the plurality of randomly generated encrypted message keys, and a message authentication code (MAC) that is calculated and added for every sub-key of the plurality of different sub-keys, to the receiver device such that the receiver device is able to perform a MAC-based verification to test sub-key validity of the plurality of different sub-keys;
- wherein when the sender device selects the plurality of different sub-keys from the negotiated noisy secret utilizing random selection, the sender device includes sub-key masks that indicate selected bits from the negotiated noisy secret in the encrypted message, and the receiver device obtains the plurality of different sub-keys from the negotiated noisy secret utilizing the sub-key masks.

16. A sender system, comprising:
- a memory storing instructions, and
- a computer processor executing the instructions for:
- utilizing, by the sender system, a randomly generated message key for encrypting a message to send to a receiver system;
- selecting, by the sender system, a plurality of different sub-keys from a negotiated noisy secret to encrypt the randomly generated message key and to generate a plurality of randomly generated encrypted message keys, wherein the sender system selects the plurality of different sub-keys from the negotiated noisy secret utilizing one of:
- a deterministic algorithm, or
- random selection;
- encrypting, by the sender system, the message utilizing the randomly generated message key; and
- sending, by the sender system, the encrypted message, the plurality of randomly generated encrypted message keys, and a message authentication code (MAC) that is calculated and added for every sub-key of the plurality of different sub-keys, to the receiver system such that the receiver system is able to perform a MAC-based verification to test sub-key validity of the plurality of different sub-keys;
- wherein when the sender system selects the plurality of different sub-keys from the negotiated noisy secret utilizing random selection, the sender system includes sub-key masks that indicate selected bits from the negotiated noisy secret in the encrypted message, and wherein the receiver system obtains the plurality of different sub-keys from the negotiated noisy secret utilizing the sub-key masks.

\* \* \* \* \*

UNITED STATES PATENT AND TRADEMARK OFFICE
CERTIFICATE OF CORRECTION

PATENT NO. : 10,972,283 B2
APPLICATION NO. : 16/352503
DATED : April 6, 2021
INVENTOR(S) : Serguei Velikevitch et al.

Page 1 of 1

It is certified that error appears in the above-identified patent and that said Letters Patent is hereby corrected as shown below:

In the Specification

Column 5, Line 64, replace " $\prod_{0}^{3:1} \frac{1024-128-i}{1024-i}$ " with -- $\prod_{0}^{31} \frac{1024-128-i}{1024-i}$ --.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*